Sept. 3, 1968     BO FOLKE HOLMBERG ETAL     3,399,768
LUMBER OR BOARD SORTING APPARATUS
Filed May 12, 1966     4 Sheets-Sheet 1
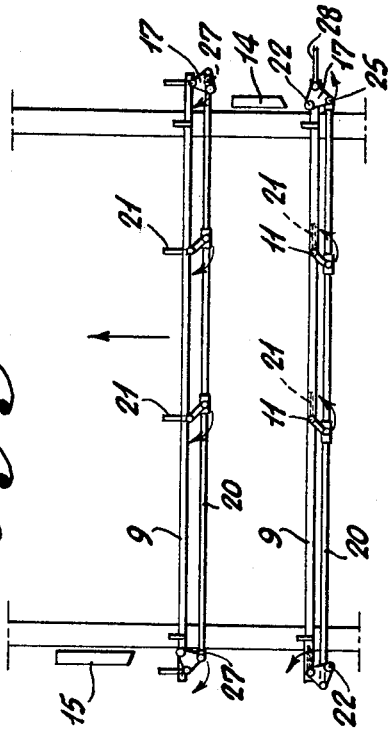
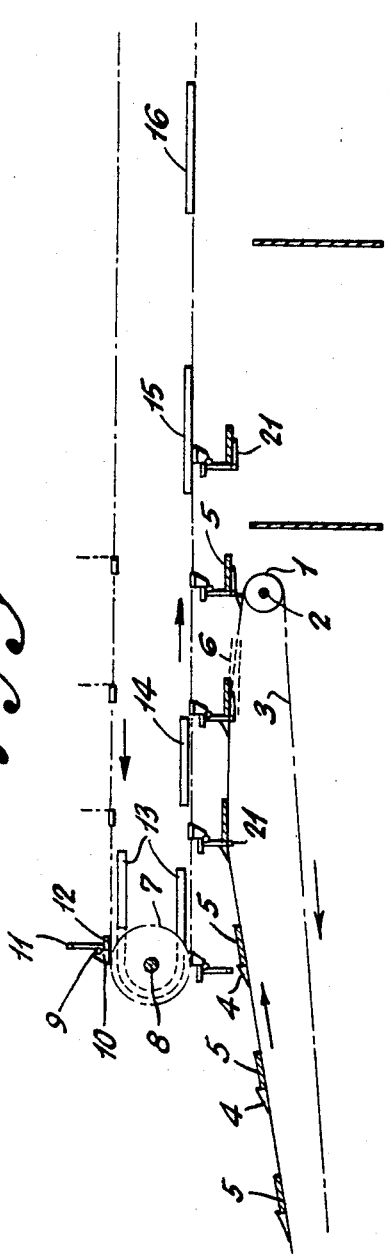
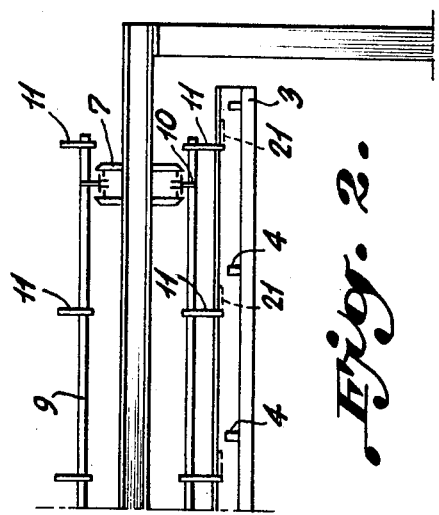
INVENTORS
BO FOLKE HOLMBERG
UHLRICH KOHLBERG
BY Glascock, Downing & Seebold
ATTORNEYS Sept. 3, 1968 BO FOLKE HOLMBERG ET AL 3,399,768
LUMBER OR BOARD SORTING APPARATUS
Filed May 12, 1966 4 Sheets-Sheet 2
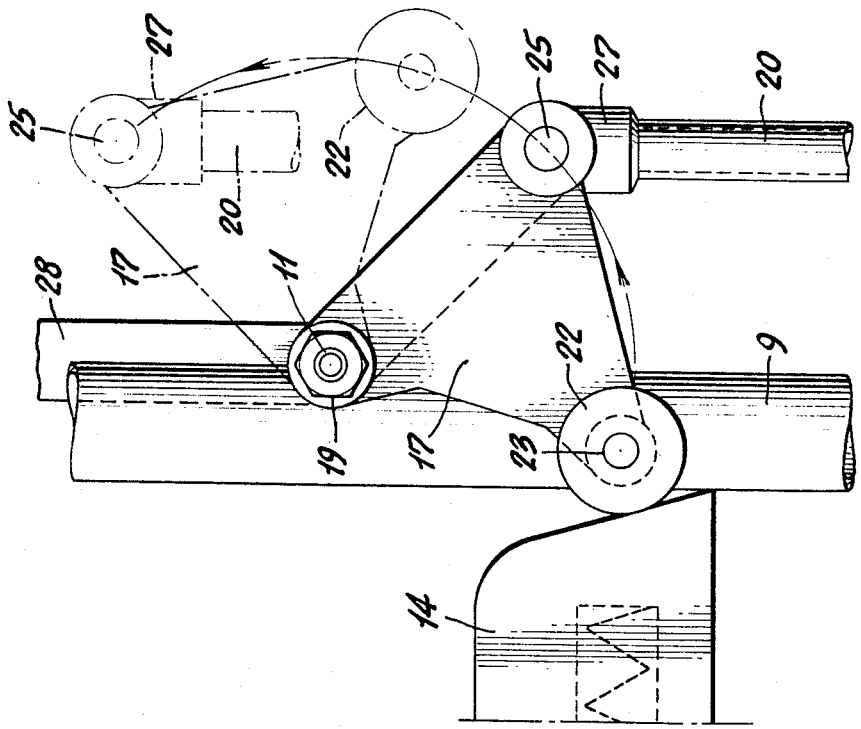
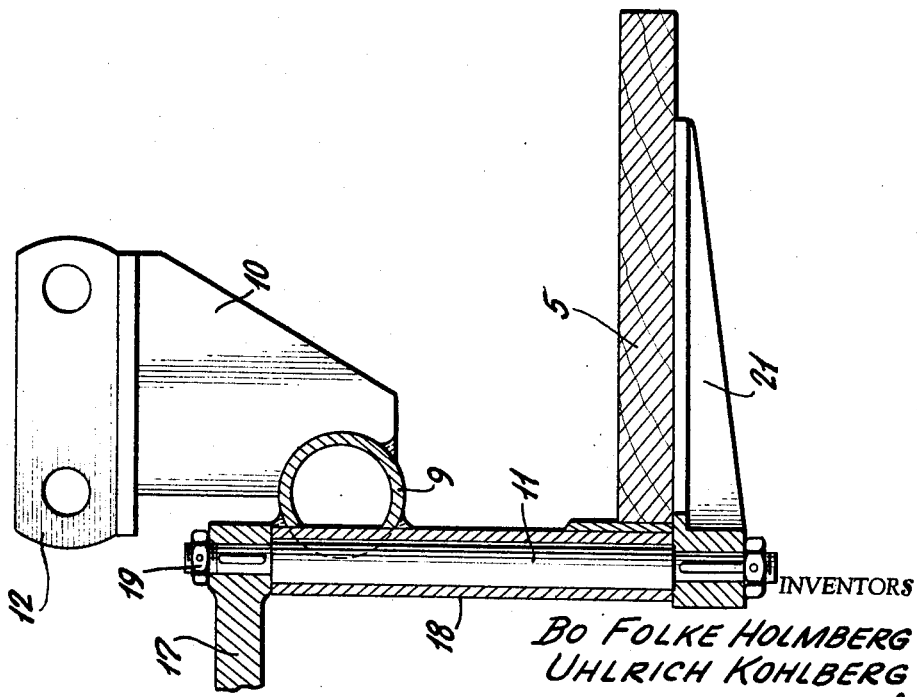
INVENTORS
*Bo Folke Holmberg*
*Uhlrich Kohlberg*
BY *Glascock, Downing & Seebold*
ATTORNEYS

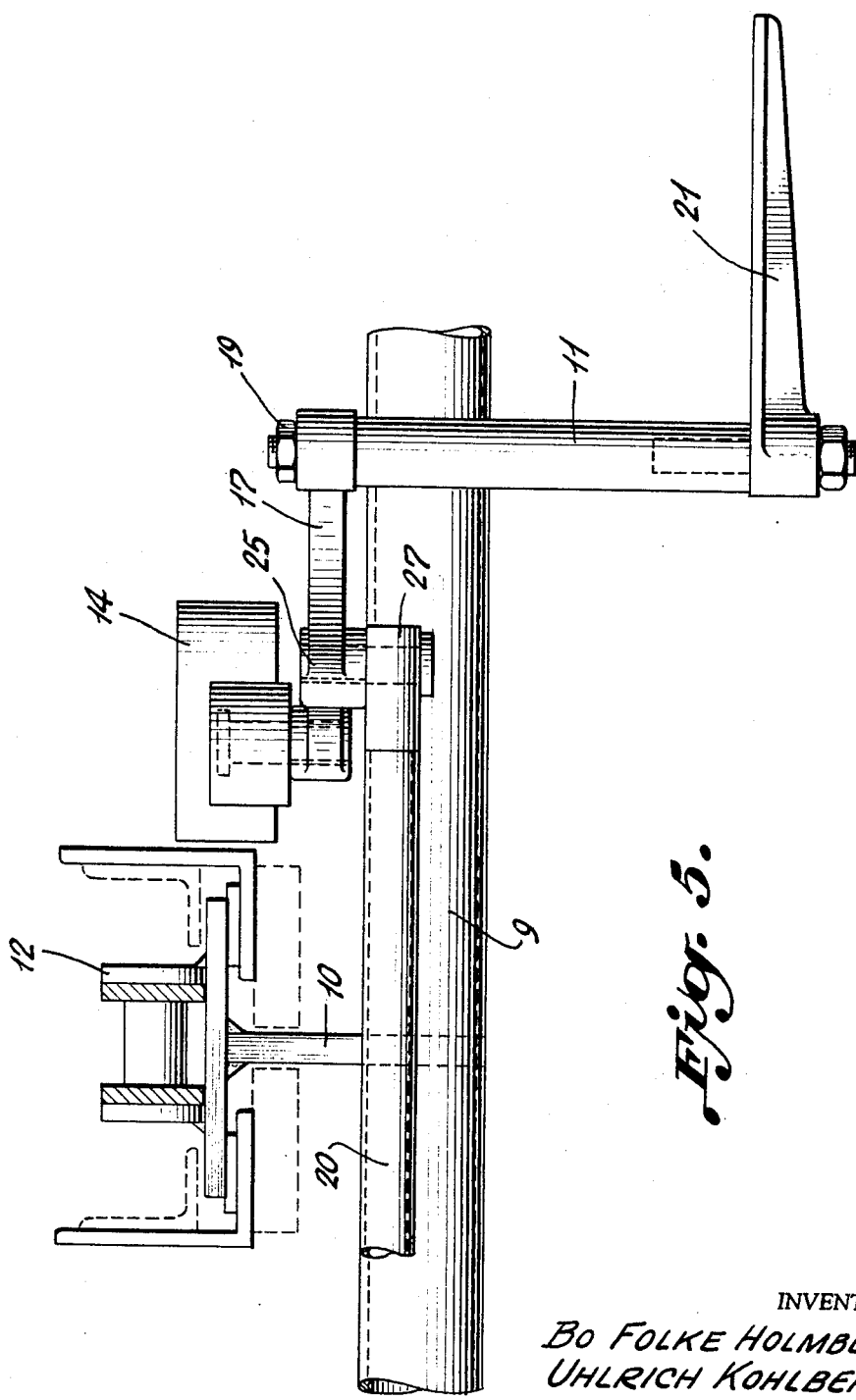

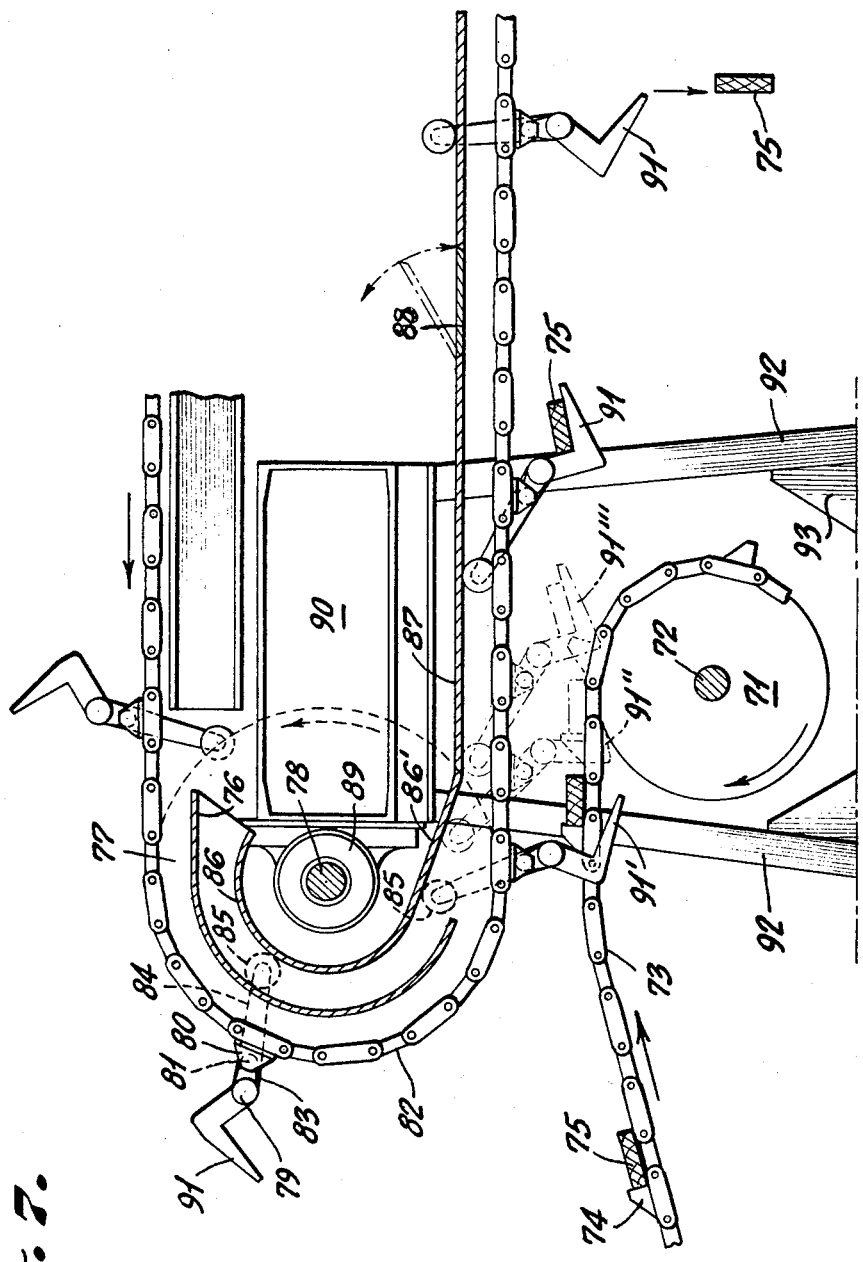

United States Patent Office 3,399,768
Patented Sept. 3, 1968

3,399,768
LUMBER OR BOARD SORTING APPARATUS
Bo Folke Holmberg, Nyland, and Uhlrich Kohlberg, Farsta, Sweden, assignors to Aktiebolaget Hammars Mekaniska Verkstad, Nyland, Sweden
Filed May 12, 1966, Ser. No. 549,597
Claims priority, application Sweden, May 19, 1965, 6,507/65; Oct. 28, 1965, 13,902/65
5 Claims. (Cl. 209—125)

ABSTRACT OF THE DISCLOSURE

A lumber or board sorting apparatus in which a transverse conveyor moves the lumber or boards to sorting compartments or bins and a carrier cooperable therewith serves for moving the lumber or boards from such conveyor to the preselected compartments. The carrier is of a generally L-shaped configuration and includes means for either turning substantially about a vertical axis when releasing a board in a selected compartment or in a substantially vertical plane when executing such operation.

---

The present invention relates to improvements in a lumber or board sorting apparatus of the type where a transverse conveyor is provided for the transportation of the lumber or boards to preselected compartments, that is so-called sorting compartments.

Several apparatuses of this type are already known and different methods have been proposed for the removal of the pieces of lumber from the conveyor and their distribution to preselected compartments. A longitudinal conveyor, however, has, of course, to move considerably faster than a transverse conveyor in order to have the same capacity, i.e., in order, for instance, to be able to transport an equal number of boards past a fixed point per unit of time.

Transverse conveyors are already known by which lumber may be distributed to predetermined points alongside the conveyor. Such conveyors, however, have heretofore been subject to certain drawbacks. In the event, for instance, of variations in lumber dimensions, the lumber at times has jammed the conveyor.

The main object of the present invention is to provide carrier means for a transverse conveyor of the type described, and which carrier means are constituted and arranged so as to transport lumber from a first conveyor, preferably a transverse conveyor, and out to preselected sorting compartments.

The carrier means according to the invention are of a general L-shaped or hook-shaped configuration and provided with means for either turning substantially about a vertical axis when releasing a board into the selected compartment, or turning in a substantially vertical plane when performing said operation.

The above and other objects of the invention will be further described in the following specification taken in connection with the annexed drawings, and in which drawings:

FIGURE 1 is a schematic side view of an arrangement comprising two cooperating transverse conveyors to which the improvement according to the invention may be applied, FIGURE 2 is a part sectional view of the arrangement shown in FIGURE 1, FIGURE 3 is a part elevational view of the arrangement shown in FIGURE 1, FIGURE 4 shows an L-shaped member according to the invention and further means cooperating with said L-shaped member, shown partly in section and in a side view corresponding to FIGURE 1, FIGURE 5 is a side elevational view of FIGURE 4 viewed from the left, FIGURE 6 is a top plan view of the left portion of FIGURE 5, and FIGURE 7 is a side view of a modified embodiment of a device according to the invention.

In FIGURE 1 a driving wheel 1 is shown, with a shaft 2 which is synchronized with a further second transverse conveyor 3, the latter being further described below. The conveyor 3 is in the usual manner provided with means 4 comprising fingers for transporting the objects, in this case pieces of lumber or boards 5, with a constant spacing as seen in the direction of transport. At the end of the transverse conveyor 3 a braking member or braking bar 6 is provided to engage the boards 5 at their lower surface in such a manner that they are lifted over the upper edge of the fingers 4 and rest on the bar 6 while the fingers 4 pass freely thereunder. This braking arrangement is already known but serves an additional function in a device according to the invention, as will be described hereinafter.

It is specifically pointed out that this invention is not limited to the case where the boards 5 are transported to the braking bar 6 by means of a transverse conveyor. On the contrary, this transportation may be carried out by means of any suitable device, for instance, by means of a longitudinal conveyor. It is only of importance that the boards arrive within reach of the transverse conveyor within a time interval which is well defined in terms of the operating cycle of the conveyor. This time interval may preferably be synchronized with the driving members of the conveyor by means of a suitable mechanical interlock.

The transverse conveyor to which the L-shaped members are attached is powered from a motor (not shown) via a driving wheel 7 and a shaft 8. In the device here described, which uses two cooperating transverse conveyors, the shaft 2 of the wheel 1 and the shaft 8 of the wheel 7 may preferably be connected with one another by means of a mechanical synchronizing device in order to obtain an accurate synchronization between the fingers of the two conveyors, respectively. The reason for this will be explained below.

An arrangement according to the invention is provided with a transverse member 9, in this case a tube, which is secured such as by welding to a metal plate 10 attached to a link 12 of the conveyor in the manner shown in FIGURES 4 and 5. As will be further described with reference to FIGURES 5 and 4, the tube 9 is provided with at least two L-shaped members rotatably secured thereto and comprising a stem portion 11 which is essentially perpendicular to the direction of travel of the conveyor and a foot portion 21 essentially forming a right angle with the stem portion 11. The driving wheel 7 is located adjacent one or more cams 13 which are provided for turning the stem portion 11 around its longitudinal axis in such a way as to make the foot portion 21 point in a direction in which it is substantially parallel with the edges of the boards 5. The two conveyors, as described above, are synchronized with one another via their driving shafts 8 and 2 so as to provide, at least where fingers 4 and portions 11, 21, respectively, cooperate with one another, a constant phase relation between said fingers and said portions. This relation is chosen in such a way that the portions 11, 21 are located a small distance behind the forward edge of the fingers 4 so that, at the place where the two conveyors cooperate, the portions 11, 21 will be shoved in under the board 5 to be transported. Here it should be pointed out that the transverse conveyor 3 is of course provided with at least two chains or the like working in parallel and also at least two corresponding driving wheels 1 cooperating with its respective chain so that each of the boards 5 is transported in a direction substantially perpendicular to the longitudinal axis of the board carried by at least two such fingers.

The second conveyor, of course, is also provided with at least two cooperating chains 12, portions 11, 21 and driving wheels 7.

To simplify the following description of the invention, only the elements on one side of the conveyor will be described and it will be understood that the description is applicable to the entire conveyor. A cam 14 is arranged in the vicinity of the braking bar 6 cooperating with the second conveyor, and which cam is arranged to make the stem portion 11 turn in such a way as to make the lower horizontal foot portions 21, which are secured to the lower end of the stem portion 11 of the L-shaped member, turn to a position under the board 5, as will be further described with reference to FIGURES 4–6. In an arrangement according to the invention, the braking bar has the further function to act as a brake for the boards 5 in order to assure that they will be pushed back all the way on the foot portions 21 so as to come into engagement with the stem portion 11. After the boards 5 have been transferred in this way from the conveyor 3 to the foot portions 21 they will each be carried along the length of the conveyor until each arrives in a position over the respective sorting compartments into which that particular board is to be placed.

A device according to the invention is supposed to cooperate with some automatic or semi-automatic sorting or grading system and which may be provided with opening cams 15, 16, preferably electro-magnetically controlled, and arranged in a manner which is described below. The control should be such that the stem portion 11 is turned in such a way as to turn the foot portions 21 outwards and away from their position under the boards 5, in which position the boards are carried to a second position in which the boards are no longer held by the foot portions but are dropped in their respective sorting compartments in which they are to be temporarily stored according to a preceding sorting operation.

FIGURE 2 shows a section of the device shown in FIGURE 1 in which, however, only half of the device is shown. The figure shows clearly how a plurality of stem portions 11 is each provided with a foot portion 21 so as to form an L-shaped member, which L-shaped member is arranged to extend between the fingers 4 of the transverse conveyor 3. Further details are shown in FIGURES 4–6.

FIGURE 3 shows in plan how an opening cam 15 and a turning cam 14 may be arranged on either side of the transverse conveyor so as to force a bar 20 in one direction or the other in order to cause the stem portion 11 to turn and thereby turn the foot portion 21 between its active or passive position, as will be further described hereinafter.

FIGURE 4 is a side view of an L-shaped member according to the invention. As shown in the drawing, the transverse member, i.e. tube 9, is attached to the metal plate 10, with this latter plate being secured to the link 12 of the conveyor. A vertical bushing 18 is secured to the tube 9 and the stem portion 11 is rotatably arranged in the bushing. The foot portion 21 is secured to the lower end of the stem portion 11, for instance by means of a hexagonal nut. To the upper end of the stem portion 11 a lever or triangular plate 17 is secured, for instance by means of a hexagonal nut 19. The stem portion 11 and the foot portion 21, together forming the L-shaped member according to the invention, are arranged to be turned about the longitudinal axis of the stem portion 11 when the plate 17 is acted upon.

FIGURE 5 shows a device according to FIGURE 4 as viewed from the left, and the figure shows how the turning cam 14 is arranged to transmit a change-over movement to the plate arrangement via a roll 22, i.e. the metal plate 17 which is supported on a shaft 23, and which metal plate 17 is secured to the upper end of the stem portion 11. The bar 20 which transmits the change-over movement to the other stem portion or portions 11 in the same row is attached to the third corner of the triangular plate 17. The connection between the bar 20 and the plate 17 is by means of an eye 27 and a bolt 25. Furthermore, an arm 28 may be provided which allows for a manual changeover (see FIGURES 3 and 6).

In the modified arrangement shown in FIGURE 7, 71 designates a sprocket wheel which is secured to a shaft 72. The wheel and the shaft constitute one turning point for an upwardly inclining conveyor provided with a chain 73 having fingers 74 adapted to transport pieces of lumber or similar elongated articles 75, e.g. boards from storage, with the remainder of this conveyor not being shown in the drawings. A second conveyor is arranged above the first-mentioned conveyor and has its turning point about a wheel 77 which is set on a shaft 78 and provided with chains or the like 82. This last-mentioned conveyor moves in a direction opposite to the first-mentioned conveyor's movement. The chains 82 are provided with a plurality of carriers 80. The carriers 80 are provided with pivots 81 on which L-shaped hooks 91 are arranged to move forward together with the chain 82 and at the same time turn in a vertical plane passing through the upper and lower chains 82 and the wheel 77. This is achieved by placing transverse carrying mmebers 79 perpendicular to the chains 82. The carrying members 79 are each provided with at least two hook-shaped or L-shaped members 91. The members 79, 91 are secured to the pivot 81 of the carrier 80 by means of an arm 83 and a further arm 84 is secured to the member 79. The further arm carries a roll 85 at its free end. When the L-shaped members are moved forwards along with the chain 82 and the carrier 80, the rolls 85 will pass between two guiding surfaces 76 and 86 when the arrangement is just about to begin to turn about the wheel 77. The guiding surface 86 ends in a descending plane 86' which continues in a horizontal guiding surface 87 running along the entire length of the lower part of the chain 82 of the upper conveyor immediately above the chain. The hook 91 and its associated members will therefore be forced to turn in a vertical plane and successively occupy the positions 91', 91", 91''', so that the hook- or L-shaped member successively will arrive in a position to catch a board 75 arriving on the lower conveyor 73. It is to be understood that the conveyors in the modified embodiment are preferably synchronized in the manner set forth previously in connection with the embodiment first described.

The L-shaped member or hook will retain the orientation indicated by 91''' as it travels towards the right hand side in the drawing (FIGURE 7), towards and over one or more of a plurality of sorting compartments (not shown). The board 75 is to be delivered to one of the several compartments depending on its length, quality or similar characteristics. This is attained in the following manner:

In the vicinity of and above the compartment in question, the guiding surface 87 is provided with a door 88 which may be turned up or down between the two positions shown in the drawing. It is to be understood that several such openings are provided along the length of the conveyor, each opening corresponding to one sorting compartment and each opening further provided with a door to be opened only for boards of the kind which are to be delivered to the sorting compartment in question. When the board is to be delivered to its sorting compartment the following takes place:

The L-shaped member or hook 91 together with its board 75 moves to the right and the roll 85 rolls on the lower side of the guiding surface 87. At the same time, or shortly before, the device arrives over the appointed compartment, sorting signals are set into motion to act upon conventional electro-magnetic means which cause the door 88 to be opened so that, for instance, it forms an angle of 30° with the guiding surface 87. As evident from the description and drawing, the hook will tend to turn about the pivot 81 so that the roll 85 will pass through the opening and come to rest above the guiding surface 87. As shown far to the right in FIGURE 7, this will cause the board 75 to be released and to fall down into the appointed compartment.

Some further details are also shown in the drawings. For instance, numeral 89 designates one of the supporting bearings of the wheel 77, 90 designates a chassis for the bearings, and 92, 93 designate supports for the chassis structure.

It is to be understood that some modifications may be made in the embodiment without departing from the spirit of the invention. It is possible, and may even be advantageous, to provide the L-shaped members in the first embodiments with spring means which normally cause the member to be in its carrying position and only to be deflected when passing over the designated compartment. These and other similar modifications could be made without departing from the spirit and scope of the invention as set forth in the claims.

What is claimed is:

1. In a lumber sorting device including a means to feed pieces of lumber one at a time in succession to a predetermined position adjacent a plurality of lumber bins lying parallel to said pieces of lumber when in said predetermined position and a distributing conveyor adapted to remove each piece of lumber from said predetermined position and deliver it in a selected one of said bins; said distributing conveyor comprising at least one endless conveyor element extending in a plane normal to the length of a piece of lumber at said predetermined position and passing over said plurality of bins, a member carried by said conveyor element parallel to the length of said piece of lumber at said predetermined position, and of said bins, at least two L-shaped elements comprising a downwardly extending stem portion and a foot portion, said L-shaped element being pivotally mounted on said member carried by said conveyor element, means to position said L-shaped elements with the foot portion horizontal and extending in the direction of movement of said endless conveyor element so that the stem portions provide a stop to engage a piece of lumber to propel it in the direction of movement of said distributing conveyor, and the foot portions provide a support for the piece of lumber as it is moved from said predetermined position, a selectively operable means adjacent each bin adapted to simultaneously turn said L-shaped members on their pivots to withdraw said foot portions from their supporting position whereby the piece of lumber will fall into the selected bin, and means controlled by an operator to selectively operate said means to turn said L-shaped elements.

2. The sorting device of claim 1 in which said L-shaped elements are pivoted on the axis of the downwardly extending stem portion, whereby when said selectively operable means turns said L-shaped means the foot portions are turned from a position lying in the direction of movement to a position normal to the direction of movement.

3. The sorting device of claim 2 in which a lever is secured to each L-shaped element to turn it, a link is provided parallel to said member carried by said conveyor element pivotally connected to each said lever, a cam engaging means is mounted on one said lever, movable cam means are located at each bin to be selectively moved into position to be engaged by said cam engaging means to rotate said L-shaped elements, and fixed cam elements are provided to return said L-shaped elements to their lumber supporting position.

4. The sorting device of claim 1 in which said L-shaped elements are pivoted on an axis at the upper end of the stem portion of said L-shaped elements normal to the direction of motion and parallel to said piece of lumber, and said selectively operable means turns said L-shaped elements in a direction to lower the leading ends of said foot portions whereupon the foot portions no longer support said piece of lumber.

5. The sorting device of claim 4 in which said L-shaped element is provided with an arm extending upwards above the pivot at the upper end of the stem, the free end of said arm being provided with a roller and in which cooperating controlling and guiding surfaces are provided to be contacted by said roller, said controlling surfaces being movable to deflect said roller, whereby said L-shaped elements are selectively pivoted.

References Cited

UNITED STATES PATENTS

| 2,385,038 | 9/1945  | Snyder    | 209—74 X  |
| 2,661,828 | 12/1953 | Vogt et al. | 198—177 X |
| 2,708,501 | 5/1955  | Boehm     | 198—177 X |
| 3,203,531 | 8/1965  | Pretot    | 198—177 X |
| 3,254,764 | 6/1966  | Boyle     | 209—73    |

ALLEN N. KNOWLES, *Primary Examiner.*